Feb. 2, 1960  R. B. COLT  2,923,861
CONTROLLER RESPONSIVE TO WIND DIRECTION AND SPEED
Filed Jan. 26, 1956  3 Sheets-Sheet 3
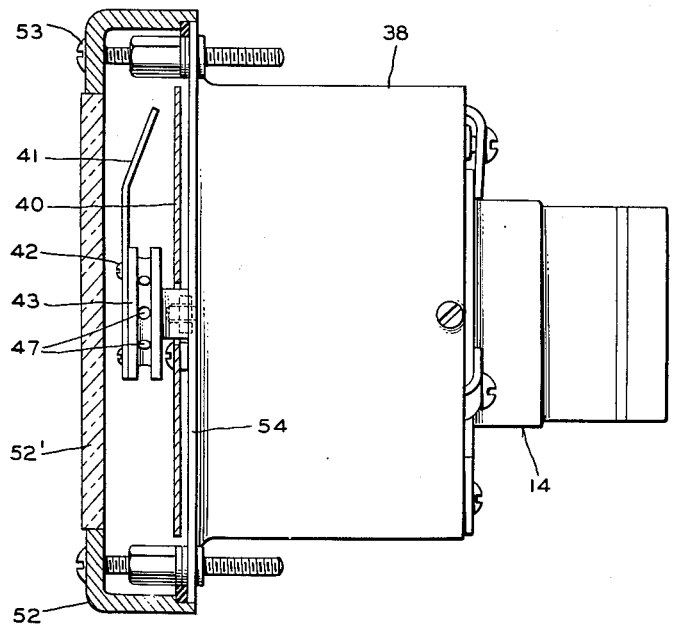
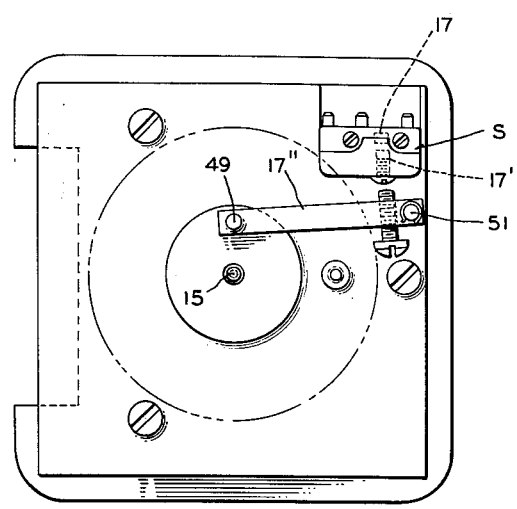
INVENTOR
Rutger B. Colt.
BY K. L. Doub
ATTORNEY

United States Patent Office 2,923,861
Patented Feb. 2, 1960

2,923,861

CONTROLLER RESPONSIVE TO WIND DIRECTION AND SPEED

Rutger B. Colt, Baltimore, Md., assignor to Bendix Aviation Corporation, Baltimore, Md., a corporation of Delaware Application January 26, 1956, Serial No. 561,388

2 Claims. (Cl. 317—141)

The controller of the instant application constitutes an alternate type of control, and in some respects an improvement with respect to that disclosed in the copending application of Daniel A. Mazzarella, Serial No. 455,000, filed September 9, 1954 (common assignee), and now Patent No. 2,870,383. The device of application Serial No. 455,000 provides a means for automatically controlling apparatus, such as for example a stack blower or like effluent-treating means as a function of wind direction and/or speed, and a similar function may be performed by the control of the instant invention. An important feature of both controls is that they operate without the aid of follow-up mechanism; in other words, they operate independently of the device to be controlled and hence may be located at points remote from such device. In the present instance, however, the circuitry and associated apparatus is more simplified and easier adapted to different types of installations. One of the factors which contributes to simplification and facility of adaptation is the use of a synchro receiver for transmitting wind direction signals in response to angular movement of the wind vane and a synchro-powered indicator responsive to the transmitter synchro. However, the use of a synchro-type indicator gave rise to a problem in presetting the directional signal circuit to cover selected wind direction ranges over a full 360 degree movement of the wind vane, and the means for solving this problem constitutes an important feature of the present invention.

The principal objects of the present invention, therefore, are: to render a control of the type specified readily adaptable to different installations; to provide a convenient means in such control for presetting the direction signal, and to generally improve and simplify the control circuitry.

The foregoing and other objects and advantages will become apparent in view of the following description taken in conjunction with the drawings, wherein:

Figure 3 is a section taken through the dial portion of the wind direction indicator of Fig. 2;

Figure 4 is a view in elevation of the direction indicator with the front cover, pointer and dial removed;

The controller of the instant invention comprises coacting speed and direction signal circuits arranged in a manner such that they may be readily connected in series or parallel to the device to be controlled. The speed circuit incorporates a speed indicator which receives its signals from a propeller-driven D.C. magneto or tachometer-generator carried by a conventional wind-responsive transmitter, and the direction circuit incorporates a synchro-driven direction indicator which is positioned by a transmitting synchro also carried by said transmitter. The direction indicator synchro is provided with a common mounting for any selected one of a series of switch-control cams contoured to cover compass ranges of, for example, 45, 90, 135 and 180 degrees veering about a selected compass point or wind direction. When any one of these cams is mounted on its fitting, the cam rise serves to actuate a main circuit control switch when the wind direction coincides with cam location. These cams are easily installed in any one of a plurality of positions, preferably eight in number, about the shaft of the indicator synchro. In this manner, a contact in multiples of 45 degrees in any one of eight directions is selectable in accordance with conditions encountered. Due to the fact that the wind usually does not hold steady at a given value but varies with the degree of gustiness, and also veers from one direction to another, a time-delay relay is connected in series with the direction and speed control circuits and the main control circuit or circuits. The speed indicator preferably comprises an adjustable contact voltmeter type of relay which has separate contacts for high and low values of wind speed. Either of these contacts energizes a relay when the preset value of wind speed is attained and closes the main control circuit. A controller equipped in accordance with the present invention adapts itself for almost any desired combination of wind speed and direction, either in series or parallel relationship.

Figure 1:
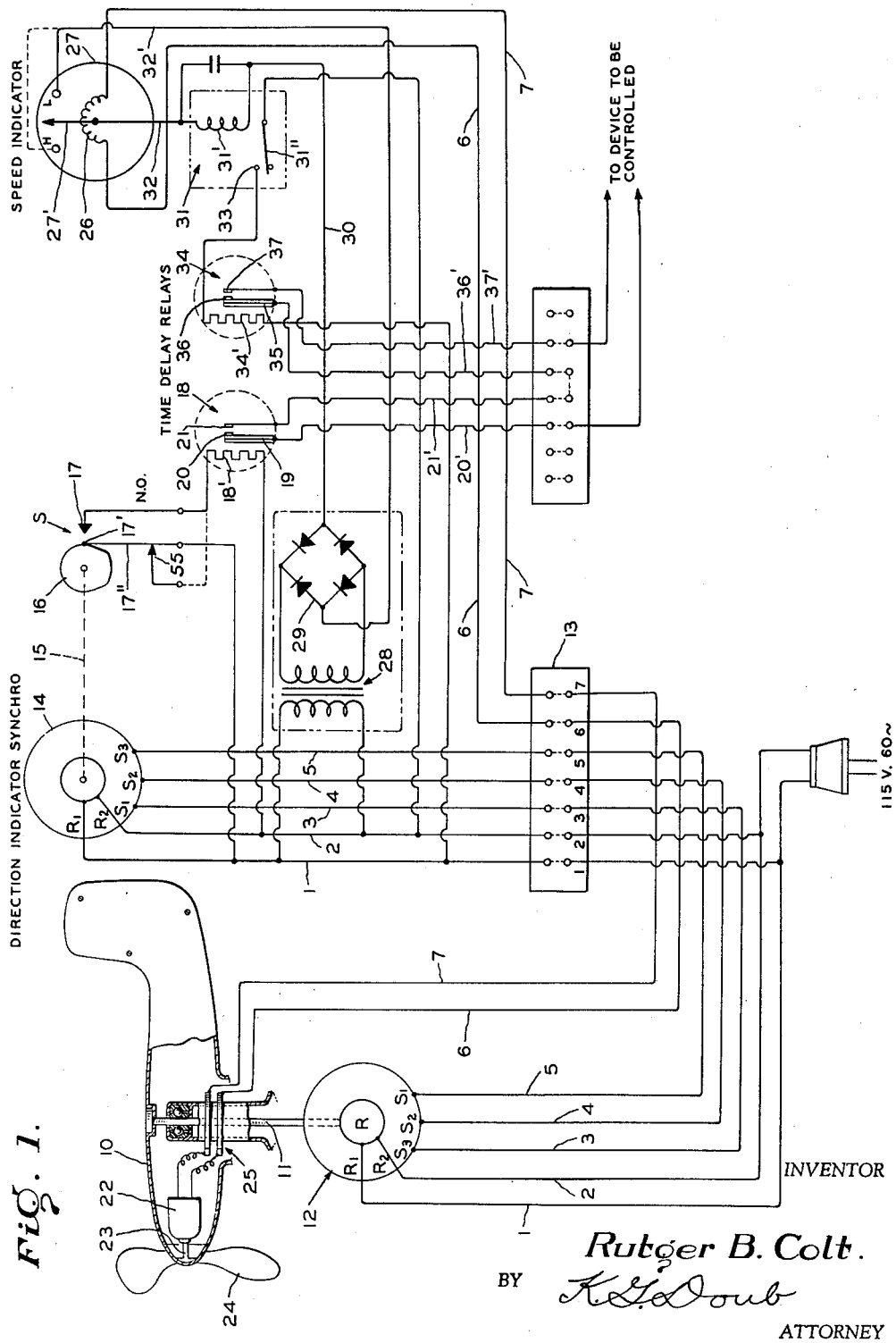
Figure 1 is a circuit diagram of a controller in accordance with the invention.
Figure 5:
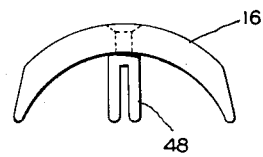
Figure 5 is a detail view of one of the direction signal control cams.

Referring to the drawings and first the Fig. 1, a transmitter is shown schematically at the left of the figure and comprises a weather vane, the body of which is schematically illustrated at 10, secured on the upper end of a shaft 11, the lower end of said shaft having a drive connection with the rotor R of a synchro generator 12. The stator coils of the synchro 12 are connected by way of circuit wires 3, 4 and 5 across a terminal board 13 with the stator coils S1, S2 and S3 of a direction signal synchro 14. The rotor of the synchro 14 angularly positions a shaft 15, on which is mounted any one of a series of switch-control cams, to be described, one of which is diagrammatically illustrated at 16 and in its physical form in Fig. 5. These cams control a switch S, having a contact 17 adapted to be engaged by a coacting contact 17', carried by a switch arm 17" connected to one side (wire 1) of the supply line. The contact 17 of switch S connects with the other side of the supply line (wire 2) across heating coil 18' of time delay relay 18. When contact 17' engages 17, time-delay relay 18 has its heater coil energized and this in turn heats temperature element 19, which after a predetermined delay, effects closure of contacts 20 and 21 and connects main control circuit wires 20' and 21'.

Figure 2:
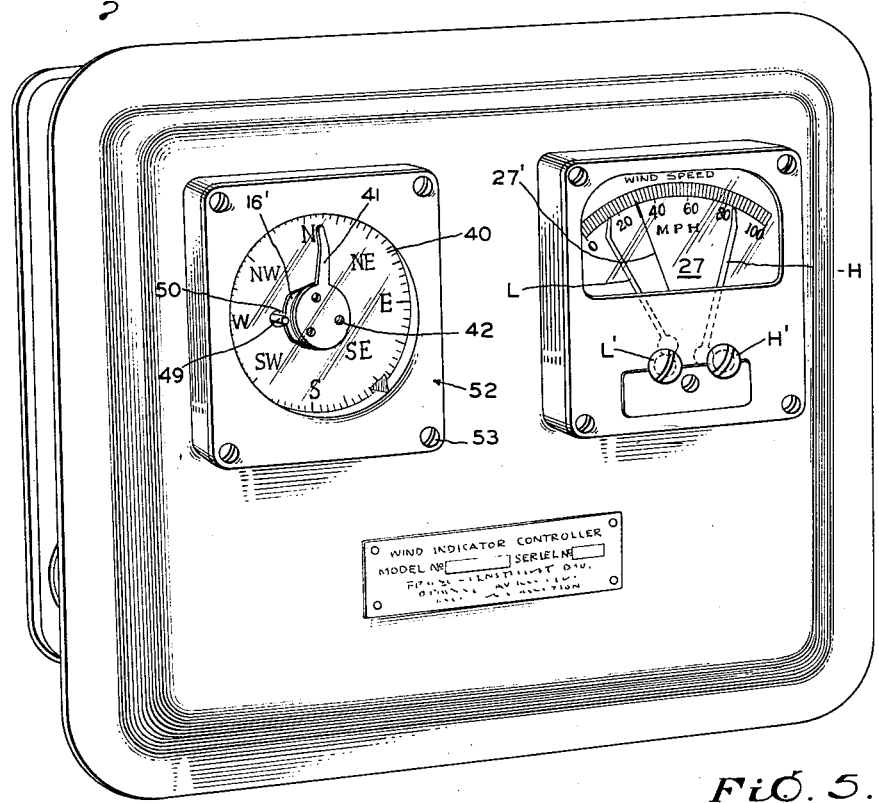
Figure 2 shows a physical embodiment of the control, looking in perspective at the front panel of the control box or housing.

The weather vane 10 has mounted therein a tachometer-generator 22. This tachometer-generator or magneto has its armature shaft 23 driven by propeller 24 and hence puts out a voltage which is proportional to wind speed. The output of the generator 22 is electrically connected by way of a brush and slip ring assembly 25 and wires 6 and 7 across the panel 13 and thence across the coil 26 of a voltmeter type speed indicator 27, provided with a pointer or indicating arm 27' adapted to engage any one of two contacts marked H (high) and L (low), note Fig. 2, where the high and low contacts consist of a pair of adjustable arms controlled by adjusting knobs H' and L'. The speed indicator pointer or arm 27' which when moved into engagement with contact L closes a relay circuit which is supplied with low-voltage direct current by step-down transformer 28 and rectifier 29, said relay circuit comprising wire 30, relay coil 31' of a low-voltage relay 31, wire 32, pointer 27' and wire 32'. The low-voltage relay 31 controls an armature 31", which when moved into engagement with contact 33, closes a circuit to the heating coil 34' of a time-delay relay 34. The coil 34' effects heating of a temperature element 35, which after a predetermined lapse of time closes contacts 36 and 37 and connects main control circuit wires 36' and 37'.

In Fig. 1, the circuit to the device to be controlled is shown as wired in series, in which case the said device will be energized only when both sets of contacts 20, 21 and 36, 37 are closed, which will occur when the wind is blowing at a speed within a given range and in a general direction. However, simply by disconnecting wires 21' and 36' and making independent circuit connections to the control motor of said device (parallel hook-up), the motor would be energized both when the wind is blowing within a selected speed range or in a selected direction range.

Figure 6:
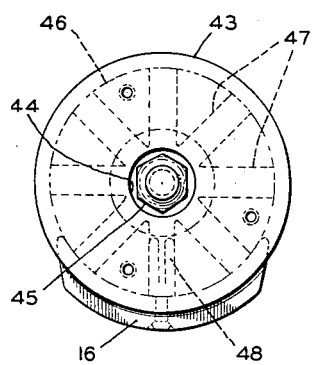
Figures 6 and 7 are detail views in elevation and section of the speed indicator shaft fitting to which the cams are selectively applied.
Figure 7:
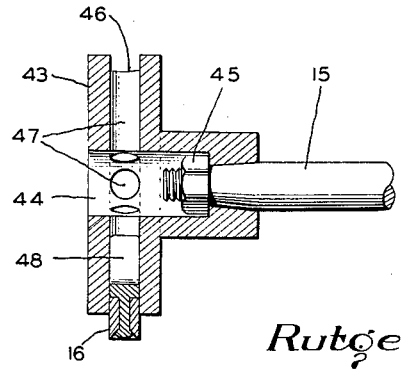

An important feature of the control as disclosed herein is the facility by means of which any desired wind direction range may be selected. If reference is had to Figs. 2 and 3 it will be noted that the indicator housing or case designated at 38, supports the synchro 14 at its rear extremity and has secured on the front thereof a dial 40, and coacting with this dial is a pointer or indicating arm 41, the said pointer being connected as by screws 42 to a cam hub or fitting 43. This cam hub or fitting is shown in detail in Figs. 6 and 7; it is provided with a center bore 44, which is reduced at its rear extremity to receive the shaft 15 of the synchro 14, the outer end of the said shaft being screw-threaded to accommodate a nut 45. The periphery of the hub 43 is formed with an annular recess 46, and in this recessed portion are a series of radial socket holes 47, arranged in forty-five degree spaced relation about the hub. One of the direction cams is shown in detail in Fig. 5; it has projecting inwardly therefrom socket pin 48, the said pin being split longitudinally to provide resiliency. Each cam may have an effective cam surface of 45, 90, 135, 180 degrees or, if desired, a series of cams may be provided each having an effective surface covering a selected range, so that when a plurality of cams are installed in the hub or fitting 43, their surfaces complement one another to provide a smooth contact area over a selected direction range. Whenever it is desired to change the direction range, it is only necessary to remove and reinstall the cam by inserting its socket pin in any of the holes 47 provided therefor; and whenever it is desired to increase or decrease the range, a cam having the required effective surface is substituted for the one already installed.

If reference is now had to Fig. 4, it will be noted that the switch arm 17" of Fig. 1 is located on the face of the direction indicator housing and has secured on the free end thereof a cam follower 49, which projects through an opening 50 formed in the dial 40, sufficient clearance being provided to enable the required movement of the said cam follower. Whenever the synchro shaft 15 rotates to an angular position such as will bring the cam 14 into engagement with the follower 49, the switch arm 17" is rotated in a clockwise direction about its pivot 51. When this happens, contact 17' engages contact 17 and the circuit to the time delay relay coil 18' is closed, whereupon the time delay period starts to run in the manner heretofore described.

A cover 52, provided with a transparent window 52', is secured as by screws 53 to a flange 54 on the case or housing of the synchro 14. Whenever it is desired to substitute or change the position of any selected wind-direction cam or cams, it is only necessary to remove the cover 52 to gain access to the cam hub or fitting 43, as is clearly evident from an inspection of Fig. 3.

*Operation*

From the foregoing description, the operation of the improved control system should be apparent. To summarize: when the wind changes its direction, the shaft 11 of the transmitter 10 is rotated to thereby angularly reposition the rotor of the synchro 12. Since the stator windings of the synchro 12 are connected to the stator windings of the direction indicator synchro 14, the rotor of the latter will be repositioned as a function of wind direction to thereby reposition the shaft 15 in a like manner. When this happens, the pointer 41 of the direction indicator 14 will be rotated to the direction from which the wind is blowing and at the same time the cam 16 effects closure of the contacts 17' and 17. The time delay relay coil 18' now begins to heat up, and if the wind direction remains within the range covered by the particular cam 16 which may be installed on the cam hub or fitting 43, contacts 20 and 21 will be closed; and if at this time the speed time delay contacts 36 and 37 are also closed, the main control circuit will be completed and the device to be controlled will be placed in operation. If at any time the wind veers around to a point where the cam 16 permits the contacts 17 and 17' to move apart or disengage, the time delay relay coil 18' will become deenergized, permitting the temperature element 19 to cool, whereupon contacts 20 and 21 will separate, interrupting the control circuit.

When it is desired to change the direction response or the range of response, it is only necessary to reposition the cam 16 or substitute other cams, in the manner heretofore described.

The tachometer-generator 22, which is driven by the propeller 24, generates a voltage proportional to wind velocity, and this voltage is impressed on the coil 26 of the voltmeter-type speed indicator 27, whereupon the pointer 27' will be moved in a direction determined by the polarity and magnitude of the impressed voltage. At a preset low speed, the pointer 27' will engage adjustable contact L of the speed indicator 27 and the circuit of relay 31 will be completed, whereupon armature 31" will engage contact 33, closing the circuit to heater coil 34' of the time delay relay 34. If the speed remains within the preset low range for a given length of time, contacts 36 and 37 will close; and if at this time the direction time delay relay contacts 20 and 21 are closed, the main control circuit will be energized and place the device to be controlled in operation. The knobs L' and H' of the speed indicator 27 may be readily adjusted to reset the law or high speed contacts.

The contact indicated at 55 in Fig. 1 is for use in case it is desired to effect closure of the main circuit contacts 20 and 21 when the low part of the cam 16 is in engagement with the cam follower 49. In this manner, the cam rise would serve to break the circuit while the low portion of the cam would comprise the effective surface to close the main control circuit. When the contact 55 is used, it is connected to the heating coil 18' of the time delay relay 18 as indicated in dotted lines, the contact 17 being disconnected under such conditions.

In connection with the speed indicator, the high contact H is shown "dead." However, it can be used in place of the low contact L simply by disconnecting the latter and connecting the high contact as indicated in dotted lines, or both high and low contacts may be connected into the circuit to cover speeds within a given range only.

It will be understood that the control circuitry and apparatus as disclosed herein is susceptible of limited changes in construction and design without departing from the spirit or basic characteristics of the invention.

What is claimed and desired to be secured by United States Letters Patent is:

1. In apparatus for controlling a device as a function of prevailing wind conditions, an electric power circuit for said device, a wind direction and speed transmitter having a synchro provided with a rotor responsive to changes in direction of the wind and a tachometer-generator responsive to changes in wind speed, a direction receiver synchro electrically connected to said transmitter synchro, a wind direction indicator having a movable pointer driven by the receiver synchro, a wind speed indicator having a pointer and a driving coil therefor, said driving coil being electrically connected to said tachometer-generator to be energized thereby, cam means also driven by said direction synchro, switch means controlled by said cam means and other switch means controlled by said speed indicator pointer independently of the device being controlled, said cam means being adapted to close its associated switch means only when the wind is blowing in a direction falling within a given direction range and said speed indicator pointer being adapted to close its associated switch means only when the wind has attained a given velocity, and time delay relays for controlling energization and de-energization of the power circuit, said relays in turn being controlled by said switch means.

2. In apparatus for controlling a device as a function of prevailing wind conditions, an electric power circuit for said device, a pair of time delay relays for controlling energization and deenergization of said power circuit, a pair of switches controlling the flow of current to said time delay relays, a speed indicator having a pointer adapted to close one of said switches at a predetermined low speed and a direction indicator having a pointer and cam means rotatable with the pointer for closing the other of said switches when the wind is blowing in a direction falling within a predetermined direction range, a wind direction and speed transmitter having a synchro provided with a rotor responsive to changes in direction of the wind and a tachometer-generator responsive to changes in wind speed, a direction receiver synchro having a rotor operatively connected to said cam means to effect repositioning of the latter, said transmitter synchro being electrically connected to said direction receiver synchro to angularly position the rotor of the latter as a function of wind direction and said tachometer-generator having a driving connection with said speed indicator pointer to effect driving movement of the latter.

References Cited in the file of this patent

UNITED STATES PATENTS

| | | |
|---|---|---|
| 2,067,413 | Plaisted | Jan. 12, 1937 |
| 2,095,208 | Wilhelm | Oct. 5, 1937 |
| 2,191,955 | Chappell | Feb. 27, 1940 |
| 2,619,527 | Gray | Nov. 25, 1952 |